United States Patent
Rossman

(10) Patent No.: US 11,328,073 B1
(45) Date of Patent: May 10, 2022

(54) ROBUST DATA TAGGING

(71) Applicant: Amazon Technologies, Inc., Reno, NV (US)

(72) Inventor: Hart Matthew Rossman, Vienna, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 16/407,517

(22) Filed: May 9, 2019

Related U.S. Application Data

(63) Continuation of application No. 14/482,680, filed on Sep. 10, 2014, now Pat. No. 10,296,750.

(51) Int. Cl.
  *G06F 21/62* (2013.01)
  *G06F 16/23* (2019.01)

(52) U.S. Cl.
  CPC .......... *G06F 21/62* (2013.01); *G06F 16/2365* (2019.01)

(58) Field of Classification Search
  CPC ............................. G06F 21/62; G06F 16/2365
  See application file for complete search history.

(56) References Cited

U.S. PATENT DOCUMENTS

| | | | |
|---|---|---|---|
| 7,231,668 B2 | 6/2007 | Jacobson | |
| 7,350,203 B2 | 3/2008 | Jahn | |
| 7,735,140 B2 | 6/2010 | Datla et al. | |
| 8,239,820 B1 | 8/2012 | White et al. | |
| 8,726,343 B1 | 5/2014 | Borzycki et al. | |
| 8,745,755 B2 | 6/2014 | Borzycki et al. | |
| 8,769,063 B2 | 7/2014 | Barton et al. | |
| 8,990,392 B1 | 3/2015 | Stamos | |
| 9,386,033 B1 | 7/2016 | Rossman | |
| 9,966,112 B1* | 5/2018 | Kulkarni | H04N 21/23418 |
| 2006/0136513 A1 | 6/2006 | Ngo et al. | |
| 2006/0161653 A1* | 7/2006 | Webb | H04L 63/1433 709/224 |
| 2007/0271593 A1 | 11/2007 | Sugimoto | |
| 2009/0205011 A1* | 8/2009 | Jain | G06F 8/65 726/1 |
| 2010/0070319 A1* | 3/2010 | Prafullchandra | G06Q 10/06 726/22 |
| 2012/0130781 A1* | 5/2012 | Li | G06Q 30/0241 705/14.4 |
| 2014/0214782 A1 | 7/2014 | Verma et al. | |
| 2014/0281875 A1* | 9/2014 | Branton | G06F 40/169 715/230 |
| 2014/0304512 A1 | 10/2014 | Kotov et al. | |
| 2015/0012383 A1* | 1/2015 | Touboul | G06Q 30/0609 705/26.35 |

* cited by examiner

*Primary Examiner* — Farid Homayounmehr
*Assistant Examiner* — Suman Debnath
(74) *Attorney, Agent, or Firm* — BakerHostetler

(57) ABSTRACT

Users are authorized to access tagged metadata in a provider network. A revision control and binding mechanism may be applied to tagged metadata that is added or modified by the user. A recommendation pertaining to security and compliance for the computing resource may be determined based on an analysis of the computing resource, scoring criteria, and data pertaining to customer and system data.

20 Claims, 12 Drawing Sheets

US 11,328,073 B1

ROBUST DATA TAGGING

CROSS REFERENCE TO RELATED APPLICATIONS

The present application is a continuation of U.S. patent application Ser. No. 14/482,680 entitled "ROBUST DATA TAGGING", filed Sep. 10, 2014, the contents of which are hereby incorporated by reference in entirety.

BACKGROUND

A data center is a facility that houses computer systems and various networking, storage, and other related components. Data centers may, for example, provide computing services to businesses and individuals as a remote computing service or to provide "software as a service" (e.g., cloud computing). To facilitate utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

Some virtualization technologies are capable of providing virtual resources that span two or more physical resources, such as a single virtual machine with multiple virtual processors that span multiple distinct physical computing systems. As another example, virtualization technologies may allow data storage hardware to be shared among multiple users by providing each user with a virtualized data store that may be distributed across multiple data storage devices, with each such virtualized data store acting as a distinct logical data store that provides users with the illusion that they are the sole operators and administrators of the data storage resource.

In many environments, operators of data centers that implement different types of virtualized computing, storage, and/or other network-accessible resources may allow customers to reserve or purchase access to resources in various resource acquisition modes. The computing resource provider may provide facilities for customers to select and launch the desired computing resources, deploy application components to the computing resources, and maintain an application executing in the environment. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors, and with various installed software applications, runtimes, and the like.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Figure 1:
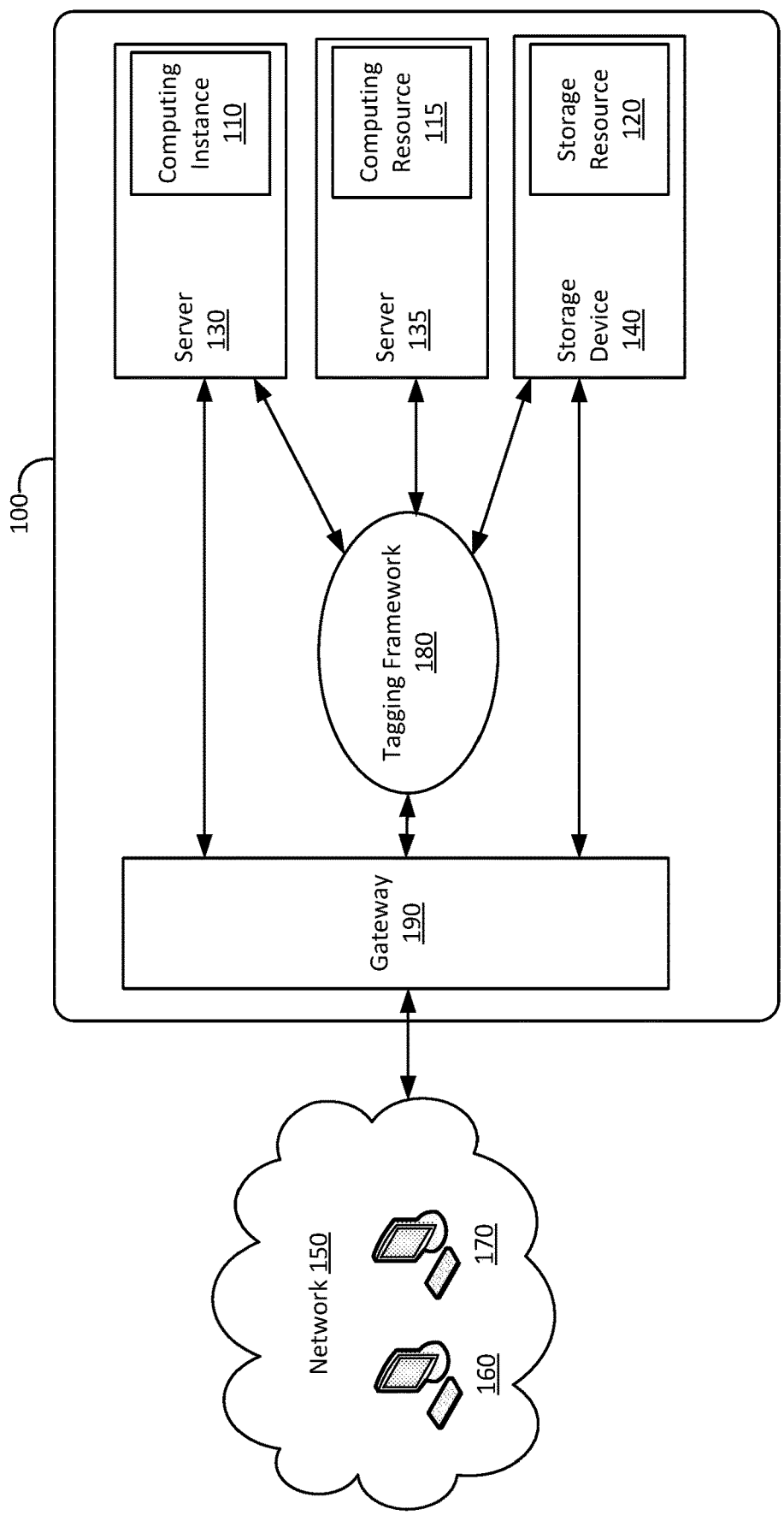
FIG. 1 is a diagram illustrating a mechanism for providing a tagging framework in accordance with the present disclosure.

A service provider, such as an entity that operates a provider network, may offer computing resources, such as computing instances and storage resources, to customers (who may also be referred to as entities or users). A customer may be any person or entity who accesses computing resources of a service provider or a provider network. The provider network may, for example, provide a web services platform. Multiple customers may access the web services platform via a computing node and issue instructions to the web services platform. The web services platform may be also be referred to as a multi-tenant web services platform to denote that multiple customers may access the platform. The web services platform may respond to instructions by performing computing operations on one or more of a plurality of computing nodes that make up the web services platform.

Other types of resources may be offered by the provider network. The service provider may also provide monitoring of a customer's instances and other resources and applications running on the resources. Monitored information may be useful for collecting and tracking various metadata and providing visibility into resource utilization, application performance, and operational health of the resources associated with customers. Such information may be useful for responding to situations in order to keep instances and applications operating smoothly.

A provider network may implement a way to tag various data with metadata, which may be helpful for managing and identifying the data and associated resources and flows. As used herein, tags may refer to a keyword, term, or other metadata associated with a piece of information (e.g., a computer file). Such a tag may be used to describe an item and allow for the associated piece of information to be searched for by browsing or searching. Tags are typically chosen informally by the creator of the information or by a subsequent viewer or editor. Tagging systems typically do not implement any degree of control over the tags. Therefore, any number of users may change or add tags at any time. The tag changes are not bound, and there is no revision history. For provider networks, tagging can be useful for operations and asset management and can add richness and robustness to the provider network's operations, but the use of tags are limited by the lack of security and confidence in the tag's contents. The present disclosure describes a tagging system that provides tags with security and integrity features.

In one embodiment, the tagging system may be implemented as a parallel tagging system that restricts access and use of the tags. Any data in the provider network may be tagged, including data records and workflows. The tags may include complementary information pertaining to the tagged data. The tagging system may incorporate identity and access control so that users who add, view, or edit tags may be restricted or controlled. The tags themselves may be controlled through version control and logging of changes and revision. For example, tags can be authenticated and signed, and authorized persons who can view or edit tags can be identified. The tagging system may maintain authorship information to identify who created or edited a tag.

Security may be provided by encrypting the tag and only allowing authorized users to view or edit the unencrypted tag. The tagging system may be implemented so as to comply with one or more standards, such as security standards.

With such a tagging system in place, the provider network can incorporate a rich set of functions that can use the tagged information to apply functions, such as billing and security groups. The provider network's computing resources and their configurations may be managed using the tags, as well as the provider network's processes and flows. For example, security operations may be performed and content security groups may be established and managed using the tags. Network loads may be operated and deleted.

In an embodiment, the tagging system may allow a user to associate security and compliance metadata with computing resources in a provider network. The tags may include out-of-band metadata that may be cryptographically bound and access restricted to only authorized users or systems. As used herein, binding may refer to processes to verify that authentication and verification was performed prior to granting access to data. The purpose of binding are to provide integrity checking and non-repudiation (i.e., commitment to the content and source of the information). The terms computationally binding and cryptographically binding may also be used. In one embodiment, tags may include pre-populated schema, which describe compliance with security and assurance frameworks, such as National Institute of Standards and Technology's Security Content Automation Protocol (NIST SCAP) and Federal Risk and Authorization Management Program (FedRAMP). Users may also create and apply their own organizations' specific security and compliance schema. Such security and compliance schema may include, for example, internal security policy references, service-level agreement (SLA), or contractual obligations. Schema may serve an operational role, marking elements for recovery, forensics details, escalation parameters, and security roles. By implementing such a tagging system, the provider network can provide greater fidelity for tagging data and provide for increased levels of control and collaboration among processes and users in the provider network. For example, if the provider network implements a shared security responsibility model, the provider network may provide services that are compliant to various security and assurance frameworks as noted above, and using the tagging system the provider network may provide useful information for user side controls, for example providing information regarding inherited controls.

The provider network can also include information regarding shared or dual controls and workflow specific controls. The tags may pertain to a variety of assets and data. For example, the tags may apply to the provider network, any data associated with the provider network, and any code or application logic associated with the provider network such as templates and workflows.

In some embodiments, security best practices can be provided via a recommendation engine. Such a recommendation engine may be configured to determine and analyze the configuration and other characteristics of the environment provisioned for the customer's resources. For example, the recommendation engine may collect metadata about provisioning and transactions associated with a customer and generate a recommendation based on security best practices.

In one embodiment, the recommendation engine can make a recommendation based on a comparison of a customer's configuration compared to a baseline or other configuration. For example, a customer's resources pertaining to financial services may be compared to configurations that are prevalent in the financial services industry. The recommendation engine may use the data available in the tagging system to determine metadata and thus access a rich set of data that can allow for dynamic analysis, as opposed to programmatically applying a checklist of items.

In some embodiments, the security recommendation engine may access security-related input from the provider network's provisioning tools, templates, configurations, and user interactions to generate security recommendations. In various embodiments, the security recommendation engine may access data, such as organizational demographics (industry, size, geography, etc.) and workload characterization (service mix, deployment targets, numbers of instances, types of instances, number of security groups, etc.). The security recommendation engine may also access performance characterization data (throughput, latency, uptime, autoscale history, access frequency, billing data, etc.) as well as configuration information available to the provider network. The information may be accessed from a variety of sources including customer account data, billing data, resource templates, resource stacks, access policies, and commands from various application programming interfaces (APIs) and other interfaces. The recommendations can provide feedback at multiple levels. For example, the recommendations can provide feedback specific to the customer's account or a set of linked accounts, and as applied across a peer group that can be defined by the provider network. Account level data may be attributable, and peer group data may be presented as non-attributable aggregate comparisons.

As an example of account specific feedback, a customer may have added two new security groups to the customer's account. Across the customer's existing linked accounts, the security recommendation engine may determine that 80% of the time the customer has included the rule [allow port 123 to 192.168.1.1]. The security recommendation engine may provide this information to the customer and provide the customer with an inquiry as to whether the customer would like to add this rule to the new security groups.

As an example of peer group feedback, the security recommendation engine may evaluate the customer's running configurations against a peer group that may be determined based on industry, size, geography, or some other characteristic, and based on the evaluation, the security recommendation engine may generate recommendations. For example, if the customer is a mid-sized credit union, the security recommendation engine may inform the customer that 85% of mid-sized credit unions in the Midwest deploying in a given geographic region have enabled an identified security feature when provisioning the same class of computing instances that the customer is using in this stack. Furthermore, the security recommendation engine may also inform the customer that 50% of those who enabled the identified security feature also enabled the provider network's server-side encryption and functions that ensured compliance with regulatory requirements for data security.

FIG. 1 is a diagram illustrating a system 100 including a framework for providing a tagging framework in accordance with the present disclosure. In FIG. 1, system 100 may include a computing instance 110, a computing resource 115, and a storage resource 120 that may be implemented, for example, on server computers 130 and 135 and storage device 140, respectively. It will be appreciated that some embodiments may involve additional resources of various types that may be instantiated on additional server computers or storage devices.

FIG. 1 also illustrates a public network 150 that may include one or more computers, such as computers 160 and 170. According to one embodiment, computing instance 110, computing resource 115, and storage resource 120 may be configured to provide computing services to a computer user (not shown) of public network 150 via gateway 190 and computers 160 and 170. For example, reserved computing instance 110 may provide a set of remote access enterprise applications to a group of users who may, for example, be employees of an enterprise customer.

A user may send a request to a tagging framework 180 for assessments pertaining to the customer's allocated resources and to generate and manage recommendations. In some embodiments, the request may be also received by services running on system 100. In response to the receipt of the request, tagging framework 180 may log the request and provide a response to the request. The tagging framework 180 may communicate with other services to facilitate: (1) processing of the request, (2) accessing data pertaining to request, and (3) generating interfaces to provide results for the request. The tagging framework 180 may provide an interface for facilitating submission of the request. The tagging framework 180 may further provide an interface for viewing the results of the request and taking further actions in response to the request.

A service, such as tagging framework 180, may be configured to store metadata for a customer's resources. The resources may include instances of various types, such as reserved resources and time-limited resources. The resources may also include other computing resources provided by the service provider, such as storage services and database services. The tagging framework 180 may access data, such as resource configuration data. The tagging framework 180 may be made accessible via an API or a user interface that may be accessed via a web browser or other input mechanisms.

In some embodiments, tagging framework 180 may include a security recommendation engine to provide security recommendations. The security recommendations may be based, for example, on a security and compliance scoring model and one or more best practices of the provider network and/or external sources, such as an industry or specialty area. The security recommendation engine may analyze a customer's allocated computing resources and generate recommendations that may be useful to indicate areas for improvements pertaining to security according to one or more categories.

In some embodiments, the security recommendation engine of tagging framework 180 may provide recommendations based on priorities and requirements provided by the customer. The recommendations may be based on an analysis of the customer's priorities and requirements as well as best practices and other information accessible by the service provider. In some implementations, recommendations may be based on data over a predetermined time period.

In one embodiment, the security recommendation engine of the tagging framework 180 may provide one or more recommendations, and the customer may be provided an option to select a recommendation and implement the recommendation. In some cases, the customer may wish to determine the potential improvement to the customer's security configuration to evaluate the results of incorporating the recommendation and verify that improvements to the configuration will be realized. The customer may modify the potential improvement if desired, and then incorporate the modified recommendation.

In response to a request to score or assess a recommendation, the tagging framework 180 may obtain information regarding the customer's current configuration that is the subject of the suggested recommendation. Taking this configuration as a starting point, the tagging framework 180 may adjust the configuration information, make adjustments in accordance with the recommendation, and assess the adjusted configuration.

In order to allow for analysis to generate recommendations for a customer, the tagging framework 180 may monitor metadata automatically, and the service provider may store monitored metadata for analysis by the resource advisor component. For example, the service provider may collect metadata for a number of pre-selected metadata at a predetermined frequency. Additional metadata may be provided at the same or different frequencies as determined by the service provider. It should be understood that the metadata may be provided for any of the computing resources provided by the service provider, including load balancers, databases, storage, and the like. The tagging framework 180 may monitor load balancers for metadata, such as request count and latency, or storage resources for metrics, such as read/write latency, free-able memory, and available storage space. The tagging framework 180 may also monitor metadata generated by the customer's applications. For example, a customer may send metadata of interest to the service provider via an API.

In some embodiments, the API may facilitate requests for generating security recommendations. For example, the API can be called with information, such as a resource identifier, resource configuration, and applications. After the API is called, in one embodiment the tagging framework 180 may take actions such as:

Invoke a detection function to generate a baseline of available metadata pertaining to the resource.
Access activity logs for the customer's resources.
Retrieve configurations of the customer's resources.
Retrieve connection states for the customer's resources.
Call available APIs that can provide metadata for the customer's resources.
Access applicable data, such as checklists, pertaining to relevant best practices.

Using the gathered information, the tagging framework 180 may analyze the data, combine or aggregate the data or extract portions of the data as appropriate, and compare the data against signature patterns to determine potential recommendations. The signature patterns may be predefined and can be made available in modules or scripts. The identified recommendations may be reported through the API along with details about the recommendations.

In one embodiment, the customer may provide requirements and priorities pertaining to the intended use for the customer's computing resources. The tagging framework 180 may generate one or more recommendations based on the customer's requirements and priorities. The tagging framework 180 may then generate one or more maturity ratings or scores as well as recommendations based on the architectures or configurations. The recommended architectures or configurations may be generated using best practices and other information described herein.

When a recommendation is provided, the customer may choose to incorporate the recommendation. The recommendation may be used to deploy the customer's resources in accordance with the recommendation. In some embodiments, more than one recommendation may be provided, and the recommendations may be prioritized and ranked based on one or more criteria. For example, a customer may select one or more best practices as a priority for the customer's requirements. The selected priorities may be analyzed to generate one or more recommendations. In one embodiment, the priorities may be merged to determine a methodology for determining a recommendation that meets the customer's requirements. The merged priorities may also be used to rank the recommendations. The ranked recommendations may be provided to the customer for review and selection. In response to selection of one of the recommendations, the selected recommendation may be incorporated into the customer's resources.

Examples of priorities may include cost and certification requirements. A customer may select one or more priorities and their relative ranking. In some embodiments, the priorities may have a default ranking if the customer does not rank the priorities. In response to the selection of priorities, the tagging framework 180 may combine the priorities if multiple priorities have been selected. If two or more priorities are in conflict, the conflict can be resolved using a conflict resolution algorithm.

Figure 2:
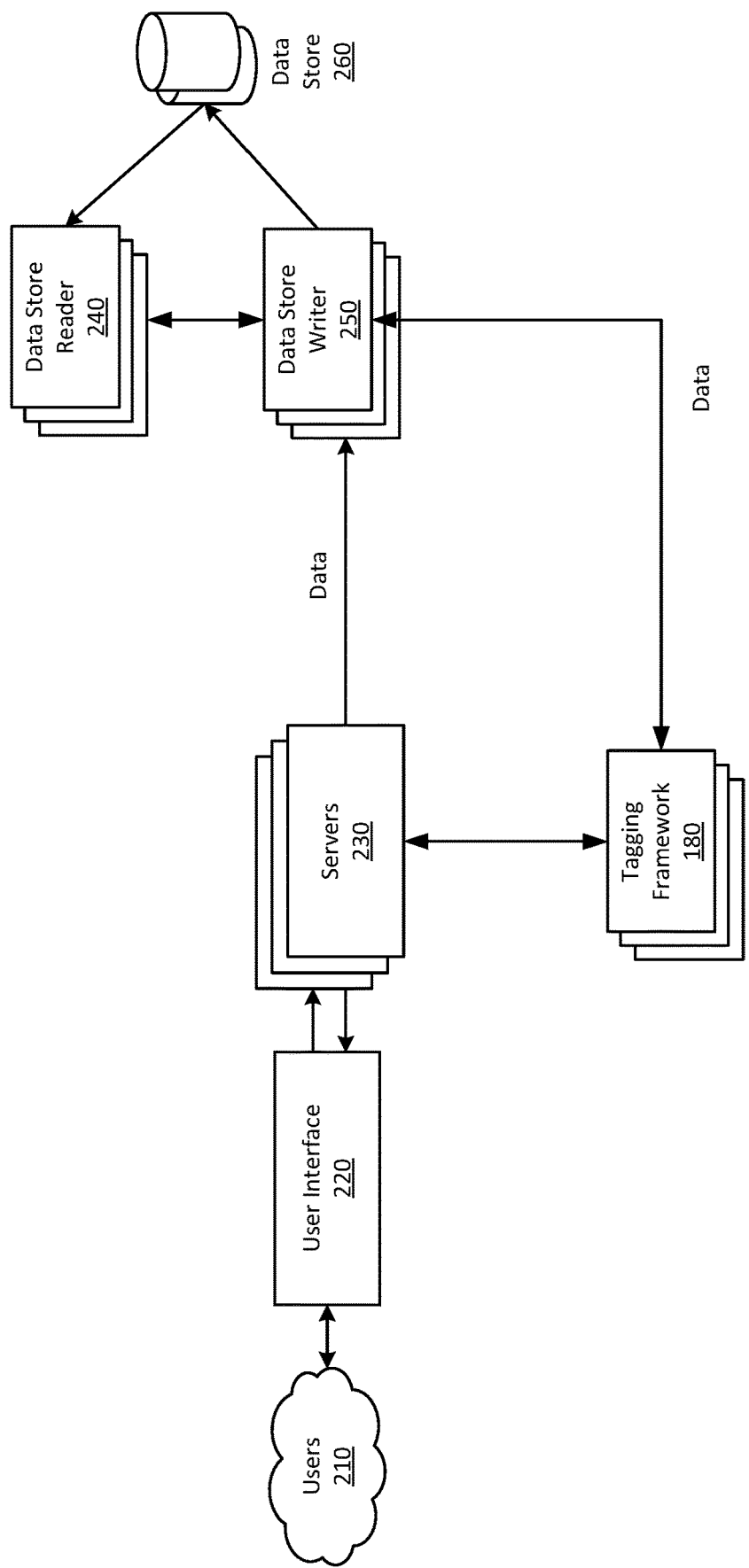
FIG. 2 is a diagram illustrating a system for a tagging framework in accordance with the present disclosure.

Referring to FIG. 2, illustrated is one example implementation of functionality associated with the tagging framework 180. The tagging framework 180 may access or cause access to various metadata and generate or cause the generation of metadata. Users 210 of the service provider may access a user interface 220 for viewing status and requesting metadata and recommendations. In some embodiments, the user interface 220 can be generated by functions implemented in software executing on one or more of the service provider's servers 230. Metadata associated with users 210 may be provided to a data store writer 250 that may store the metadata. A data store reader 240 may be configured to access the data store 260 and retrieve metadata based on requests from tagging framework 180 or for other purposes.

Figure 3:
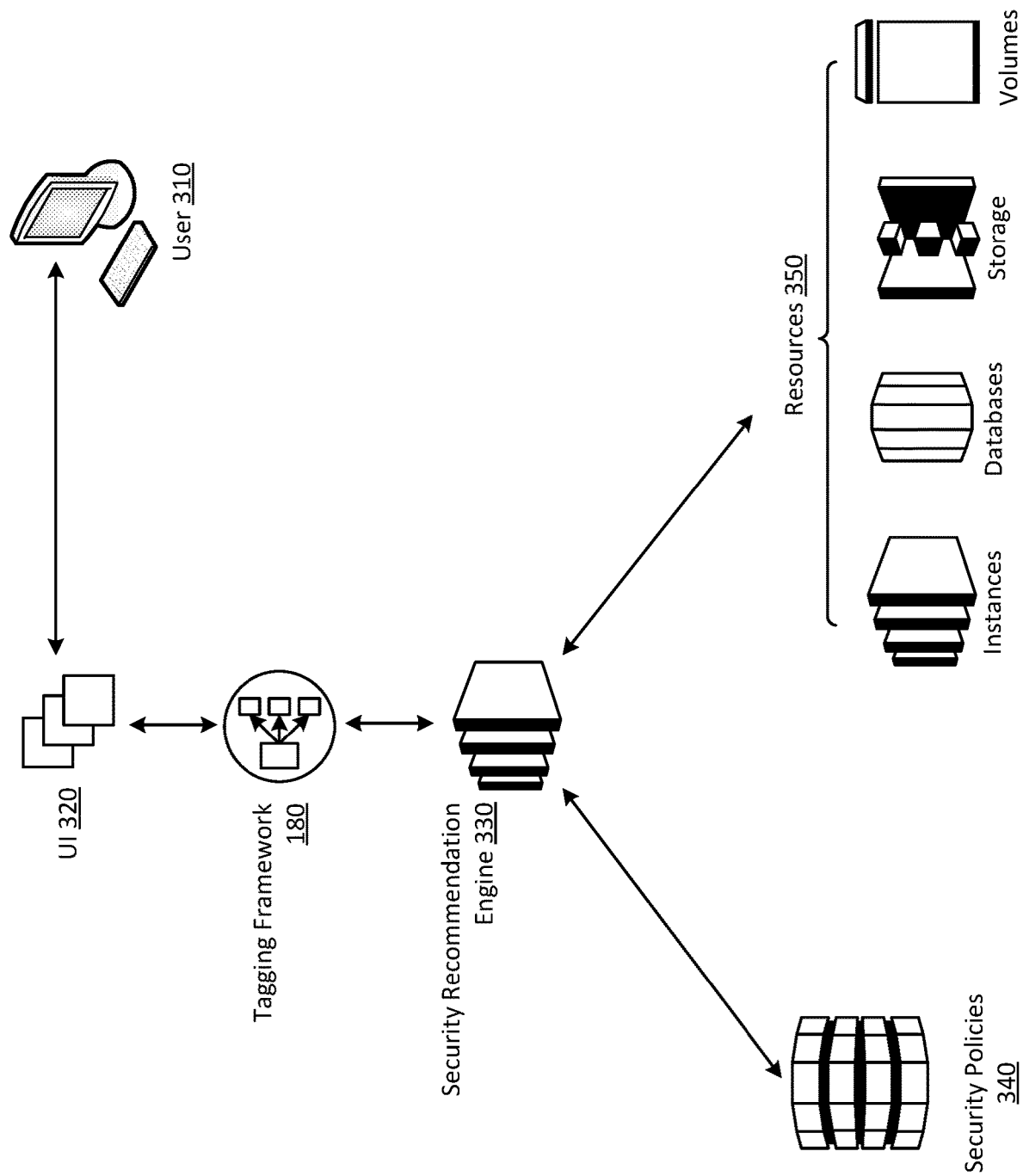
FIG. 3 is a diagram illustrating a mechanism for a tagging framework in accordance with the present disclosure.

Referring to FIG. 3, illustrated is another example of requesting metadata and recommendations in accordance with this disclosure. Referring to FIG. 3, a user 310 may access a user interface (UI) 320 depicting services related to a selected item of interest related to security analysis (e.g., a security recommendation in this example). A user interface may be generated that depicts a representation of a maturity score for the user 310. Additional user interfaces may be provided based on requests from the customer for additional data. The user interface 320, as well as other user interfaces that may be used to present security analysis information to a user, may in some embodiments be generated by the service provider and sent to the user's display for rendering. In other embodiments, the user's computing device may include functionality to generate some or all portions of the user interface. For example, the user's web browser may include code for generating some of the graphics for rendering data received from the service provider. The service provider may receive the selection information from the user's computing device and provide the requested information. The user interface 320 may be generated or caused to be generated by tagging framework 180.

Tagging framework 180 may interact with a security recommendation engine 330. The security recommendation engine 330 may access security policies 340 to generate one or more recommendations. The recommendations may be used to determine potential changes to resources 350.

Figure 4:
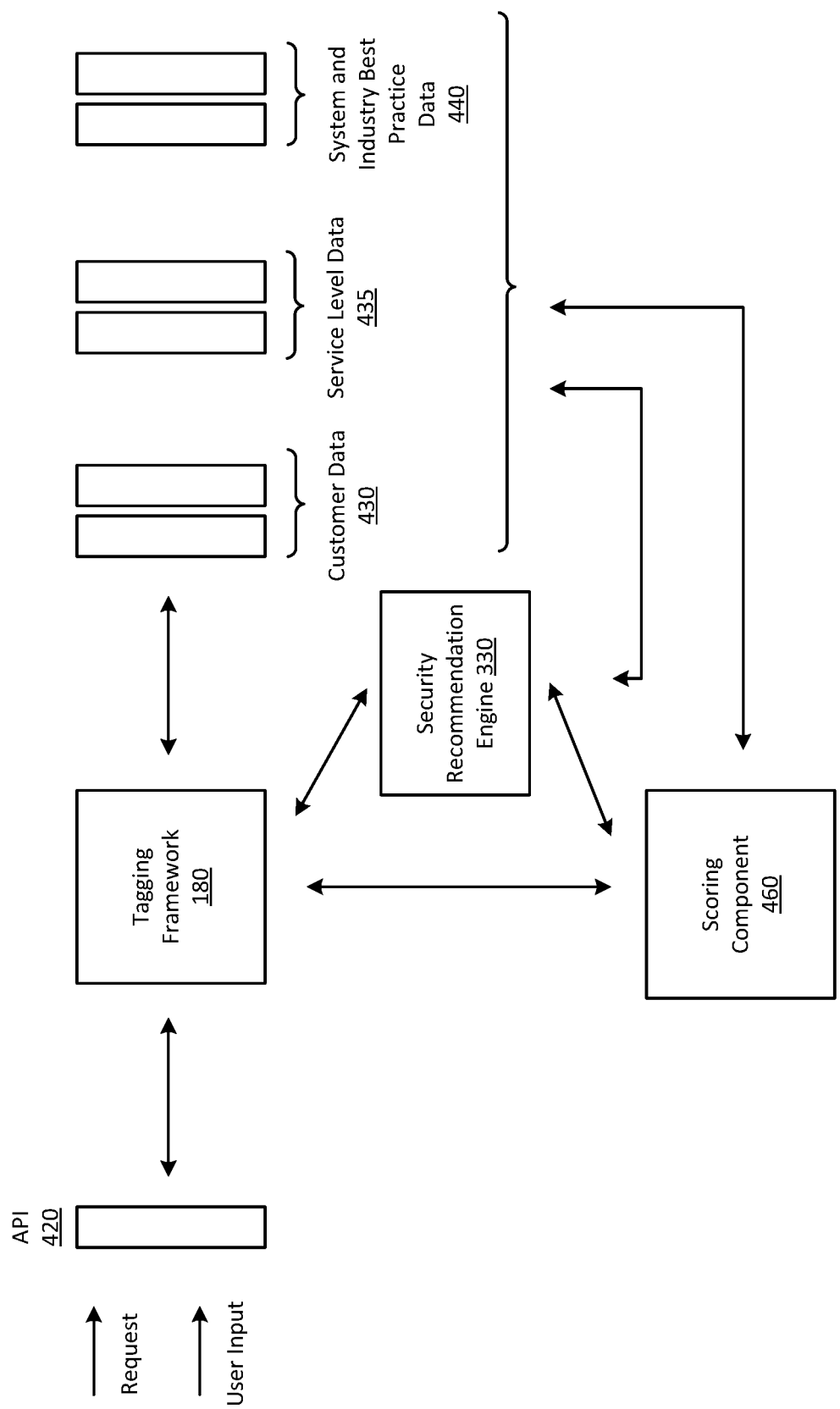
FIG. 4 is a diagram illustrating an example of a tagging framework in accordance with the present disclosure.

Referring to FIG. 4, illustrated is an example of providing a tagging framework and security recommendations in accordance with this disclosure. Referring to FIG. 4, a provider network may implement an API 420 that is configured to receive requests for metadata and recommendations. Requests may be managed by tagging framework 180 that may communicate with one or more systems in the provider network to access customer data 430, service level data 435, and system and industry best practice data 440. API 420 may also be configured to receive inputs from users pertaining to recommendations and ratings. User inputs may be managed by tagging framework 180 in addition to customer data 430, service level data 435, and system and industry best practice data 440.

Tagging framework 180 may also interact with security recommendation engine 330 and scoring component 460 to analyze the customer data 430 and system and industry best practice data 440 and determine potential recommendations. Recommendation engine 460 may analyze various parameters, such as organizational demographics, workload characterization, performance characterization, configuration information, and the like. Based on the analysis, tagging framework 180 may identify recommendations that can be provided to the user.

In some embodiments, the tagging framework 180 may monitor metadata automatically, and the service provider may store monitored metadata for analysis. For example, the service provider may collect metadata for a number of preselected resources at a predetermined frequency. Additional metadata may be provided at the same or different frequencies as determined by the service provider. It should be understood that the metadata may be provided for any of the computing resources provided by the service provider, including load balancers, databases, storage, and the like. A customer's resources may have various properties, such as the software image that is running on them, the availability zone where the resource is located, the number of CPUs, the CPU speed, the available RAM, etc.

In some embodiments, candidates for potential recommendations can be selected based on biasing to influence the selection. For example, data for an initial set of recommendations can be weighted to indicate relevance of the potential recommendations to the metadata. The weighting can be continuously updated to increase the likelihood of optimizing around the metadata. In an embodiment, the metadata can indicate biasing with respect to various properties. Biasing can indicate, for example, that some parameters are only relevant to certain properties while having no impact on other properties. The biasing can also be used to eliminate some properties from consideration. For example, in some cases the relevance of a particular property may be zero, indicating that this property is non-distinguishing for a given security feature of interest. In this case, a zero weight can be used to indicate that a particular metadata is unlikely to influence a given security recommendation, thus reducing the potential scope of the analysis.

It should be understood that the use of weights is one example implementation of a way to determine properties relevant to analysis of a metadata of interest. Other methods and algorithms may be used. Some embodiments will assign a higher weight to properties that are more relevant to security properties. Furthermore, the weights may be increased when the relevant properties are different for other resources.

The tagging framework 180 may be configured to determine which information is relevant for data collection or analysis. In some embodiments, the tagging framework 180 may implement a pattern classification system to identify relevant parameters. For example, the tagging framework 180 may include a learning system that may include a learning function to continuously learn which properties are relevant to a particular metadata or best practice. In some embodiments, supervised learning may be incorporated where administrators of the service provider may classify observations made from a particular performance metadata and their associated parameters, and assign additional tags to the metadata. The tags may be updated by the learning system to update relevance to the metadata of interest as new observations are made and assigned tags to the new observations. In other embodiments, the tagging framework 180 may learn which observations are alike and assign similar tags to these observations. The learning system may then classify future observations into categories of tags that may be created from the original observations.

In some embodiments, an algorithm, such as a selection algorithm or an induction algorithm, may be implemented to define groups or categories of metadata. Probabilistic approaches, such as Bayesian inferencing, may also be incorporated. Generally, some type of estimation may be incorporated, such as a parametric classification technique. In various embodiments, the tagging framework 180 may employ probabilistic methods to guide and narrow the parameters that are analyzed. In order to provide relevant results that are more likely to indicate recommendations for a particular observed security property, the most relevant parameters should be identified and weighted. However, the complexity of a computing environment with hundreds or thousands of networked devices may preclude a deterministic or exhaustive solution. In some embodiments a heuristic model can be used to find satisfactory solutions that provide an acceptable confidence level in the results. For example, experience-based techniques, such as expert modeling can be used to aid in the initial selection of recommendations. The heuristic model can probabilistically indicate parameters of likely impact through, for example, tagging various metadata related to a particular security property. Feedback from an initial round of analysis can be used to further refine the initial selection, thus implementing a closed loop system that generates likely candidates in situations where programmatic approaches may be impractical or infeasible. As an example, Markov modeling or variations thereof (e.g., hidden Markov model and hierarchical hidden Markov model) can be used in some embodiments to identify recommendations that may otherwise be missed using traditional methods. Monte Carlo methods, finite element analysis, and computational fluid analysis can also be used to generate recommendations in various embodiments.

The results of the analysis may take any number of forms. In one embodiment, the results may be presented as a list of potential changes that may be made to configurable parameters for a customer's resources. The list may be ordered in increasing or decreasing fashion based on potential relevance. The tagging framework 180 may provide a security recommendation to the customer based on the analysis. For example, the security recommendation may identify a potential change to the customer's configuration for selected instances that may result in improved security performance. Alternatively, the list of potential changes may be provided, and the user may make a determination as to any configuration changes to be made. One advantage of providing such a list is that the customer is provided an ordered listing of relevant parameters that may help the customer make more intelligent choices so that the customer's resources provide the desired services with the desired security performance level.

In some embodiments, the tagging framework 180 may select a period of time for analysis for comparison with another time period. For example, the tagging framework 180 may select a group of resources that have received a lower security rating during the current week, and the tagging framework 180 may select the same resources over a previous time period when the security rating was higher. The tagging framework 180 may then determine one or more parameters that may indicate a likely cause for the difference in security performance.

The service provider may also save a set of resources for use as a baseline set of resources for comparison with other resources. For example, if the service provider has identified a set of characteristics that exhibit a particular best practice that the service provider wants to save as a pattern for future matches, then the service provider may select that set of characteristics and identify the set of characteristics as a baseline or test group for comparison with other metadata at a later time.

Figure 5:
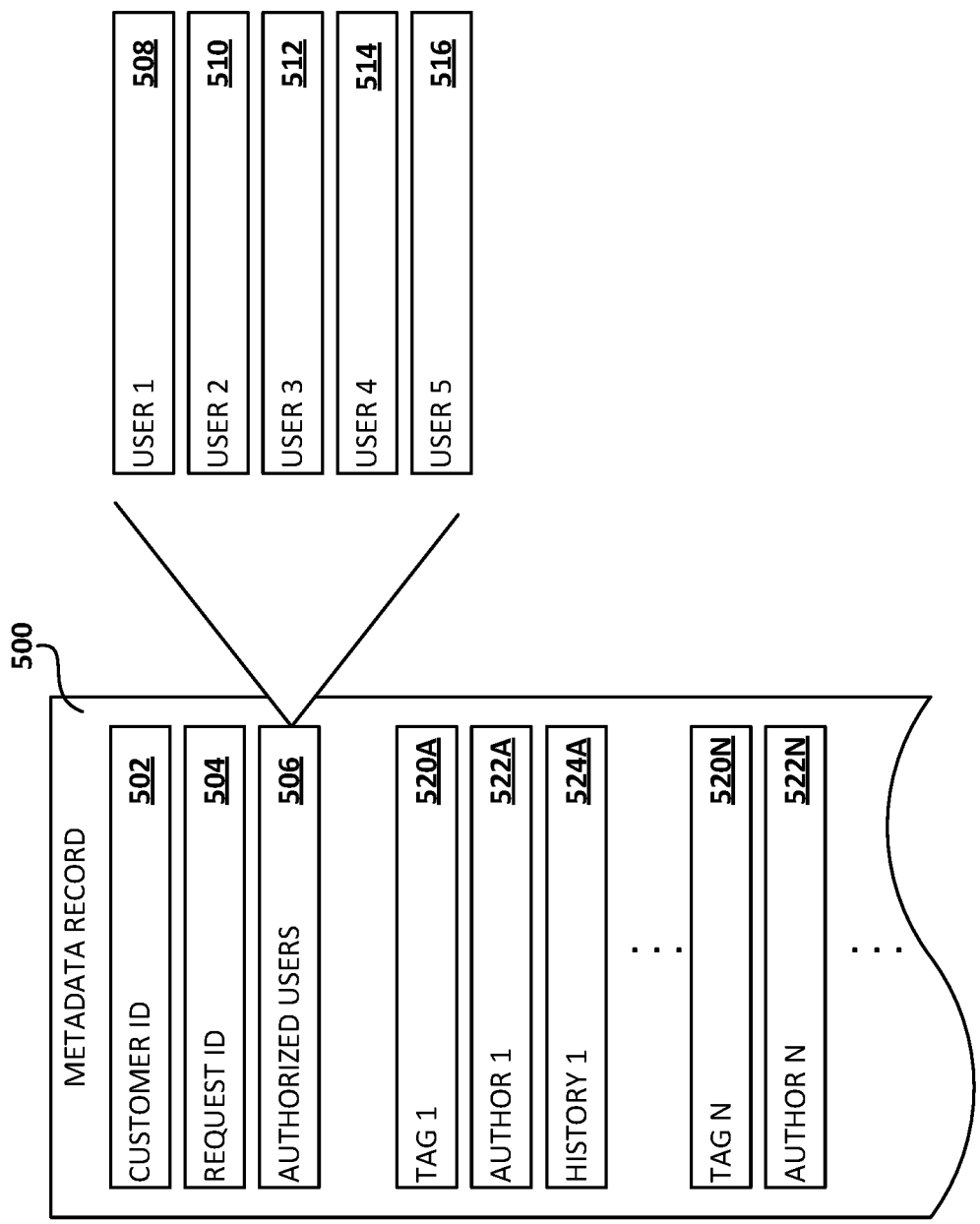
FIG. 5 is a diagram illustrating an example data record in accordance with the present disclosure.

FIG. 5 is a data structure diagram showing a number of data elements stored in a metadata record 500. It will be appreciated by one skilled in the art that the data structure shown in the figure may represent a data file, a database table, an object stored in a computer memory, a programmatic structure, or any other data container commonly known in the art. Each data element included in the data structure may represent one or more fields in a data file, one or more columns of a database table, one or more attributes of an object, one or more member variables of a programmatic structure, or any other unit of data of a data structure commonly known in the art. The implementation is a matter of choice and may depend on the technology, performance, and other requirements of the computing system upon which the data structures are implemented.

The metadata record 500 may contain a customer ID 502 identifying the customer associated with the request. The customer ID 502 may correspond to identifier information provided by the customer 520 when creating the request. According to one embodiment, the metadata record 500 may also contain a request ID 504 field identifying the request.

The metadata record 500 may also include information regarding the authorized users 506. In some embodiments, the metadata record 500 may contain information regarding the authorized users 508, 510, 512, 514, and 516 identifying the users who are authorized to view the metadata record 500. The metadata record 500 may include multiple entries or pointers to other records.

The metadata record 500 may also contain information regarding one or more tag entries 520A-520N (also referred to herein generally as "tags 520"), tag authors 522A-522N (also referred to herein generally as "tag authors 522"), and history 524A-524N (also referred to herein generally as "history 522"). It will be appreciated that the metadata record 500 may contain additional data elements beyond those shown in FIG. 5 and described above that are utilized by tagging framework 180, and/or other modules of the provider network.

Figure 6:
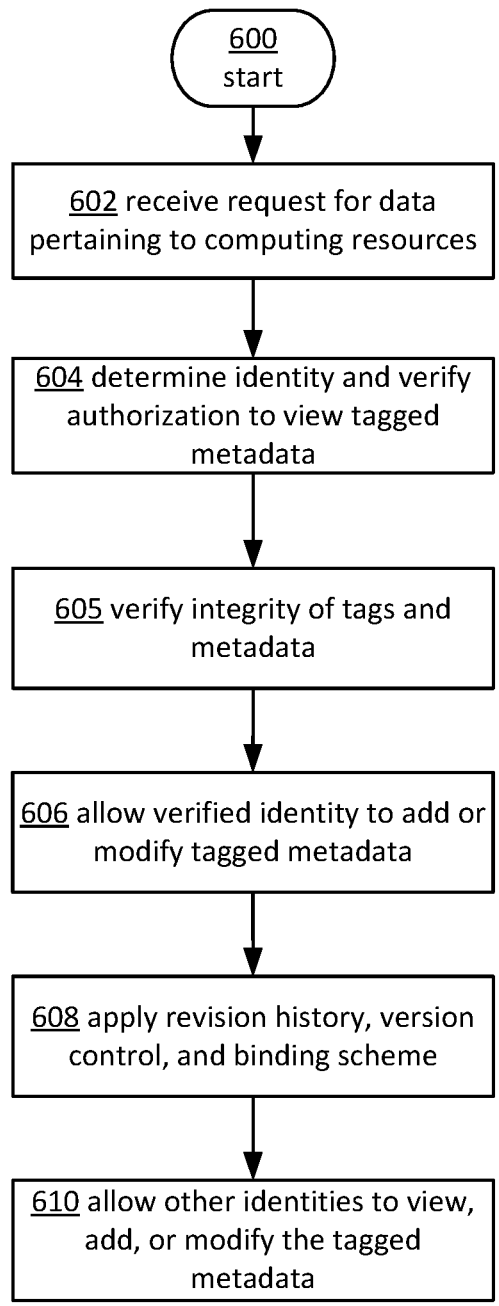
FIG. 6 is a flowchart depicting an example procedure for providing a tagging framework in accordance with the present disclosure.

FIG. 6 illustrates an example operational procedure for implementing tags in a provider network. In an embodiment, a mechanism for implementing tags can be provided by services, such as tagging framework 180 in FIG. 1. The operational procedure may be implemented in a system comprising one or more computing devices. Referring to FIG. 6, operation 600 begins the operational procedure. Operation 600 may be followed by operation 602. Operation 602 illustrates receiving a request for data pertaining to computing resources of the multi-tenant web services platform.

Operation 602 may be followed by operation 604. Operation 604 illustrates determining an identity associated with the request and verifying that the identity is authorized to view tagged metadata associated with the data.

Operation 604 may be followed by operation 605. Operation 605 illustrates verifying integrity of the tagged metadata.

Operation 605 may be followed by operation 606. Operation 606 illustrates allowing the verified identity to add or modify verified tagged metadata associated with the selected data.

Operation 606 may be followed by operation 608. Operation 608 illustrates applying a revision history, version control, and binding scheme to the added or modified tagged metadata.

Operation 608 may be followed by operation 610. Operation 608 illustrates allowing other identities to view, add, or modify the tagged metadata by verifying the other identities' authority to view, add, or modify the tagged metadata while maintaining the history and version control scheme to newly added or modified tagged metadata.

Figure 7:
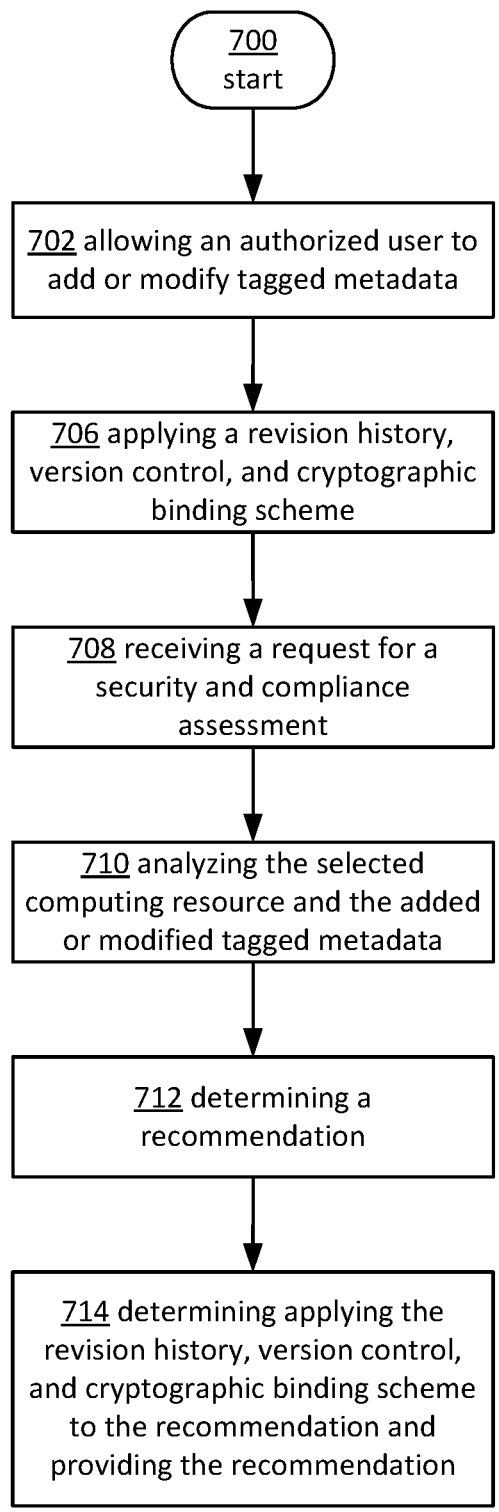
FIG. 7 is a flowchart depicting an example procedure for providing security recommendations in accordance with the present disclosure.

FIG. 7 illustrates an example operational procedure for generating security recommendations in a provider network. In an embodiment, a mechanism for generating security recommendations can be provided by services, such as tagging framework 180 in FIG. 1. The operational procedure may be implemented in a system comprising one or more computing devices. Referring to FIG. 7, operation 700 begins the operational procedure.

Operation 700 may be followed by operation 702. Operation 702 illustrates allowing an authorized user to add or modify tagged metadata associated with a selected one of the computing resources associated with a customer of the provider network.

Operation 702 may be followed by operation 706. Operation 706 illustrates applying a revision history, version control, and cryptographic binding scheme to the added or modified tagged metadata.

Operation 706 may be followed by operation 708. Operation 708 illustrates in receiving a request for a security and compliance assessment of the selected computing resource.

Operation 708 may be followed by operation 710. Operation 710 illustrates in response to receiving the request, analyzing the selected computing resource and the added or modified tagged metadata based on security reference information.

Operation 710 may be followed by operation 712. Operation 712 illustrates determining a recommendation pertaining to security for the selected computing resource based at least in part on the analysis and one or more scoring criteria.

Operation 712 may be followed by operation 714. Operation 714 illustrates determining applying the revision history, version control, and cryptographic binding scheme to the recommendation and providing the recommendation as the requested security assessment.

Various aspects of the disclosure are described with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Pert, Python, C, C++, and the like, or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 8:
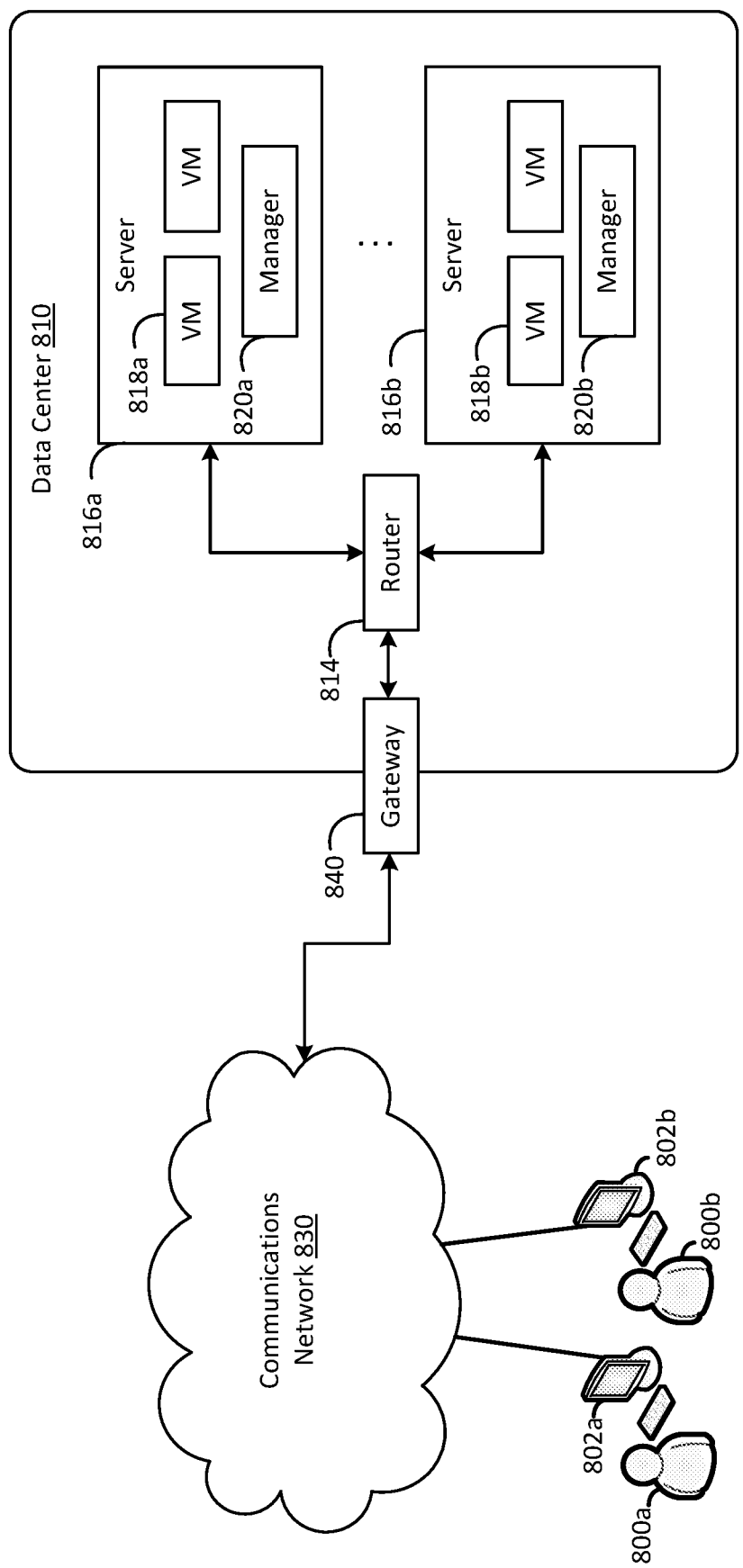
FIG. 8 is a diagram illustrating an example computing system that may be used in some embodiments.

FIG. 8 illustrates an example computing environment in which the embodiments described herein may be implemented. FIG. 8 is a diagram schematically illustrating an example of a data center 810 that can provide computing resources to users 800a and 800b (which may be referred herein singularly as "a user 800" or in the plural as "the users 800") via user computers 802a and 802b (which may be referred herein singularly as "a computer 802" or in the plural as "the computers 802") via a communications network 830. Data center 810 may be configured to provide computing resources for executing applications on a permanent or an as-needed basis. The computing resources provided by data center 810 may include various types of resources, such as data processing resources, data storage resources, data communication resources, and the like. Each type of computing resource may be general purpose or may be available in a number of specific configurations. For example, data processing resources may be available as virtual machine instances. The instances may be configured to execute applications, including Web servers, application servers, media servers, database servers, and the like. Data storage resources may include file storage devices, block storage devices and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as Web servers and/or one large processing resource as a database server, for example.

Data center 810 may include servers 816a and 816b (which may be referred herein singularly as "a server 816" or in the plural as "the servers 816") that provide computing resources available as virtual machine instances 818a and 818b (which may be referred herein singularly as "a virtual machine instance 818" or in the plural as "the virtual machine instances 818"). The virtual machine instances 818 may be configured to execute applications, including Web servers, application servers, media servers, database servers, and the like. Other resources that may be provided include data storage resources (not shown) and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies such as those provided by VMware or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 8, communications network 830 may, for example, be a publicly accessible network of linked networks and possibly operated by various distinct parties, such as the Internet. In other embodiments, communications network 830 may be a private network, such as, for example, a corporate or university network that is wholly or partially inaccessible to non-privileged users. In still other embodiments, communications network 830 may include one or more private networks with access to and/or from the Internet.

Communications network 830 may provide access to computers 802. Computers 802 may be computers utilized by customers 800 or other customers of data center 810. For instance, user computer 802a or 802b may be a server, a desktop or laptop personal computer, a tablet computer, a wireless telephone, a personal digital assistant (PDA), an e-book reader, a game console, a set-top box, or any other computing device capable of accessing data center 810. User computer 802a or 802b may connect directly to the Internet (e.g., via a cable modem or a Digital Subscriber Line (DSL)). Although only two user computers 802a and 802b are depicted, it should be appreciated that there may be multiple user computers.

Computers 802 may also be utilized to configure aspects of the computing resources provided by data center 810. In this regard, data center 810 might provide a Web interface through which aspects of its operation may be configured through the use of a Web browser application program executing on user computer 802. Alternatively, a stand-alone application program executing on user computer 802 might access an application programming interface (API) exposed by data center 810 for performing the configuration operations. Other mechanisms for configuring the operation of the data center 810, including deploying updates to an application, might also be utilized.

Servers 816a and 816b (which may be referred herein singularly as "a server 816" or in the plural as "the servers 816") shown in FIG. 8 may be standard servers configured appropriately for providing the computing resources described above and may provide computing resources for executing one or more applications. In one embodiment, the computing resources may be virtual machine instances 818. In the example of virtual machine instances, each of the servers 816 may be configured to execute an instance manager 820a or 820b (which may be referred herein singularly as "an instance manager 820" or in the plural as "the instance managers 820") capable of executing the virtual machine instances. The instance managers 820 may be a virtual machine monitor (VMM) or another type of program configured to enable the execution of virtual machine instances 818 on servers 816, for example. As discussed above, each of the virtual machine instances 818 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 810 shown in FIG. 8, a router 814 may be utilized to interconnect the servers 816a and 816b. Router 814 may also be connected to gateway 840, which is connected to communications network 830. Router 814 may manage communications within networks in data center 810, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 810 described in FIG. 8 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 810 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 810 can be scaled on-demand.

Auto scaling is one mechanism for scaling computing resources in response to increases or lulls in demand for the resources. Auto scaling allows customers of data center 810 to configure data center 810 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 810.

Data center 810 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared, and other types of information. The deployment component utilizes the customer-provided configuration and cache warming logic to launch, configure, and prime new instances of computing resources.

Figure 9:
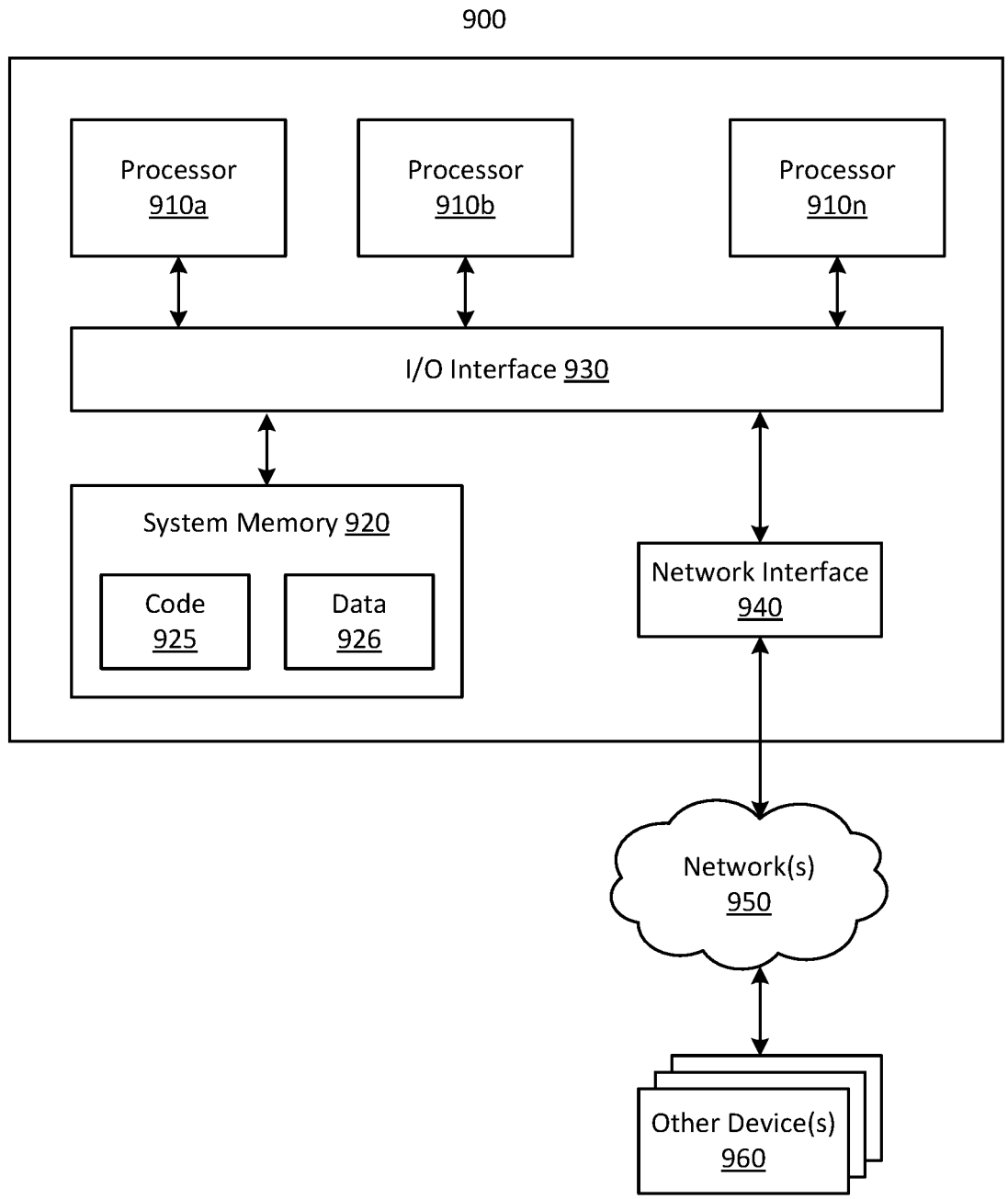
FIG. 9 is a diagram illustrating an example computing system that may be used in some embodiments.

In at least some embodiments, a server that implements a portion or all of one or more of the technologies described herein, including the techniques to implement the functionality of a tagging framework 180 may include a general purpose computer system that includes or is configured to access one or more computer-accessible media. FIG. 9 illustrates such a general purpose computing device 900. In the illustrated embodiment, computing device 900 includes one or more processors 910a, 910b, and/or 910n (which may be referred herein singularly as "a processor 910" or in the plural as "the processors 910") coupled to a system memory 920 via an input/output (I/O) interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 920 as code 925 and data 926.

In one embodiment, I/O interface 930 may be configured to coordinate I/O traffic between processor 910, system memory 920 and any peripheral devices in the device, including network interface 940 or other peripheral interfaces. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing device 900 and other device or devices 960 attached to a network or network(s) 950, such as other computer systems or devices as illustrated in FIGS. 1 through 9, for example. In various embodiments, network interface 940 may support communication via any suitable wired or wireless general data networks, such as types of Ethernet networks, for example. Additionally, network interface 940 may support communication via telecommunications/telephony networks, such as analog voice networks or digital fiber communications networks, via storage area networks, such as Fibre Channel SANs, or via any other suitable type of network and/or protocol.

In some embodiments, system memory 920 may be one embodiment of a computer-accessible medium configured to store program instructions and data as described above for FIGS. 1 and 2 for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 900 as system memory 920 or another type of memory. Further, a computer-accessible medium may include transmission media or signals, such as electrical, electromagnetic, or digital signals, conveyed via a communication medium, such as a network and/or a wireless link, such as may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices, or special purpose computer systems, in addition to or instead of being implemented using general purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g., size, platform, tenancy, availability zone, and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, customers may not be able to realize a return on their investment in the reserved instances.

Operators of such provider networks may in some instances implement a flexible set of resource reservation, control, and access interfaces for their clients. For example, a resource manager of the provider network may implement a programmatic resource reservation interface (e.g., via a Web site or a set of Web pages) that allows clients to learn about, select, purchase access to, and/or reserve resource instances. In some embodiments discussed below where an entity, such as a resource manager or a pricing optimizer, is described as implementing one or more programmatic interfaces, such as a Web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog, provide details and specifications of the different types or sizes of resources supported, the different reservation types or modes supported, pricing models, and so on.

The provider network may support several different purchasing modes (which may also be referred to herein as reservation modes) corresponding to some of the instance types described above. For example, the provider network may support long-term reservations, on-demand resource allocations or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit of time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

Figure 10:
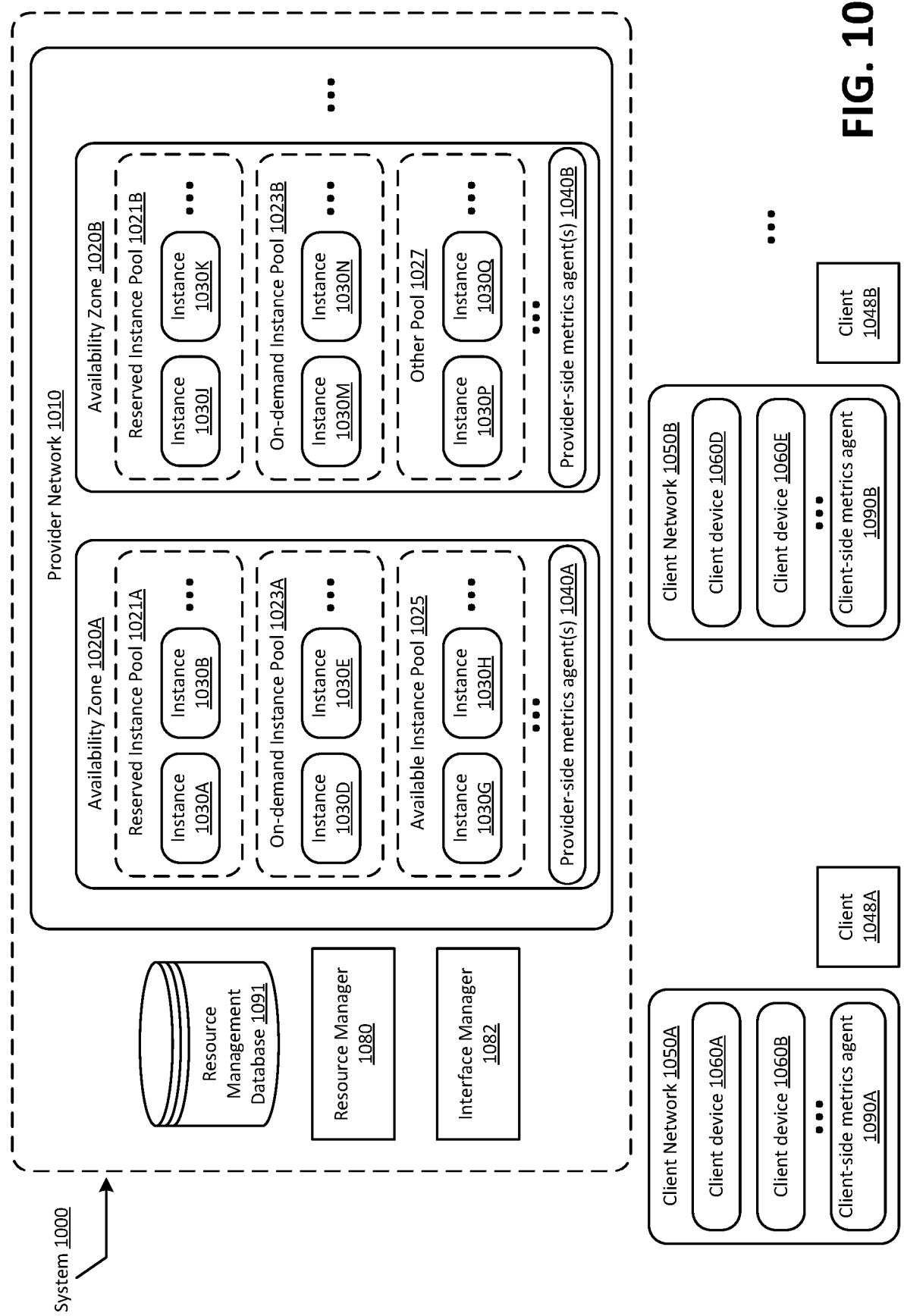
FIG. 10 is a diagram illustrating a system for providing a tagging framework in accordance with the present disclosure.

FIG. 10 illustrates an example system environment for providing instances, according to at least some embodiments. The system 1000 may include a provider network 1010 comprising a plurality of resource instances 1030 (which may be referred herein singularly as "a resource instance 1030" or in the plural as "the resource instances 1030"), such as instances 1030A, 1030B, 1030D, 1030E, 1030G, and 1030H in one availability zone 1020A and instances 1030J, 1030K, 1030M, 1030N, 1030P, and 1030Q in a different availability zone 1020B. The various resource instances 1030 in the availability zones 1020A and 1020B (which may be referred herein singularly as "an availability zone 1020" or in the plural as "the availability zones 1020") may be reserved and/or allocated for use by clients (or potential clients), such as clients 1048A and 1048B (which may be referred herein singularly as "a client 1048" or in the plural as "the clients 1048"). In the illustrated embodiment, system 1000 includes a resource manager 1080 and an interface manager 1082. As noted earlier, in some embodiments the functionality of the interface manager 1082 may be implemented by a subcomponent of the resource manager 1080.

The interface manager 1082 may in some embodiments implement one or more programmatic interfaces allowing clients 1048 to search for, browse, reserve, and acquire instances 1030 to obtain various types of services, e.g., to run and/or access various applications. In the illustrated embodiment, at a given point in time, some or all of the instances 1030 may be assigned to instance pools, such as reserved instance pools 1021A or 1021B, on-demand instance pools 1023A or 1023B, available instance pool 1025, or other pools such as other pool 1027.

In some embodiments a given pool, such as available instance pool 1025, may itself contain its own sub-pools, e.g., based on the modes of instance reservation and allocation supported. Each pool (or sub-pool) may have an associated pricing policy for its instances, as well as other properties, such as interruptibility settings, for the instances that happen to be assigned to the pool or sub-pool. The pools may represent logical collections or aggregations, so that, for example, the presence of two instances in the same pool or sub-pool may not necessarily imply anything about the physical location of the hardware used for the two instances. Although the instances 1030 illustrated in FIG. 10 are shown as belonging to availability zones 1020, in other embodiments the provider network 1010 may be organized differently, e.g., in some embodiments availability zones 1020 may not be implemented. Availability zones 1020 may be grouped into geographic regions (not shown in FIG. 10) in some embodiments. Instance pools may be implemented within availability zones in some implementations (e.g., each availability zone may have its own reserved instance pool); while in other implementations an instance pool or sub-pool may span multiple availability zones.

Figure 11:
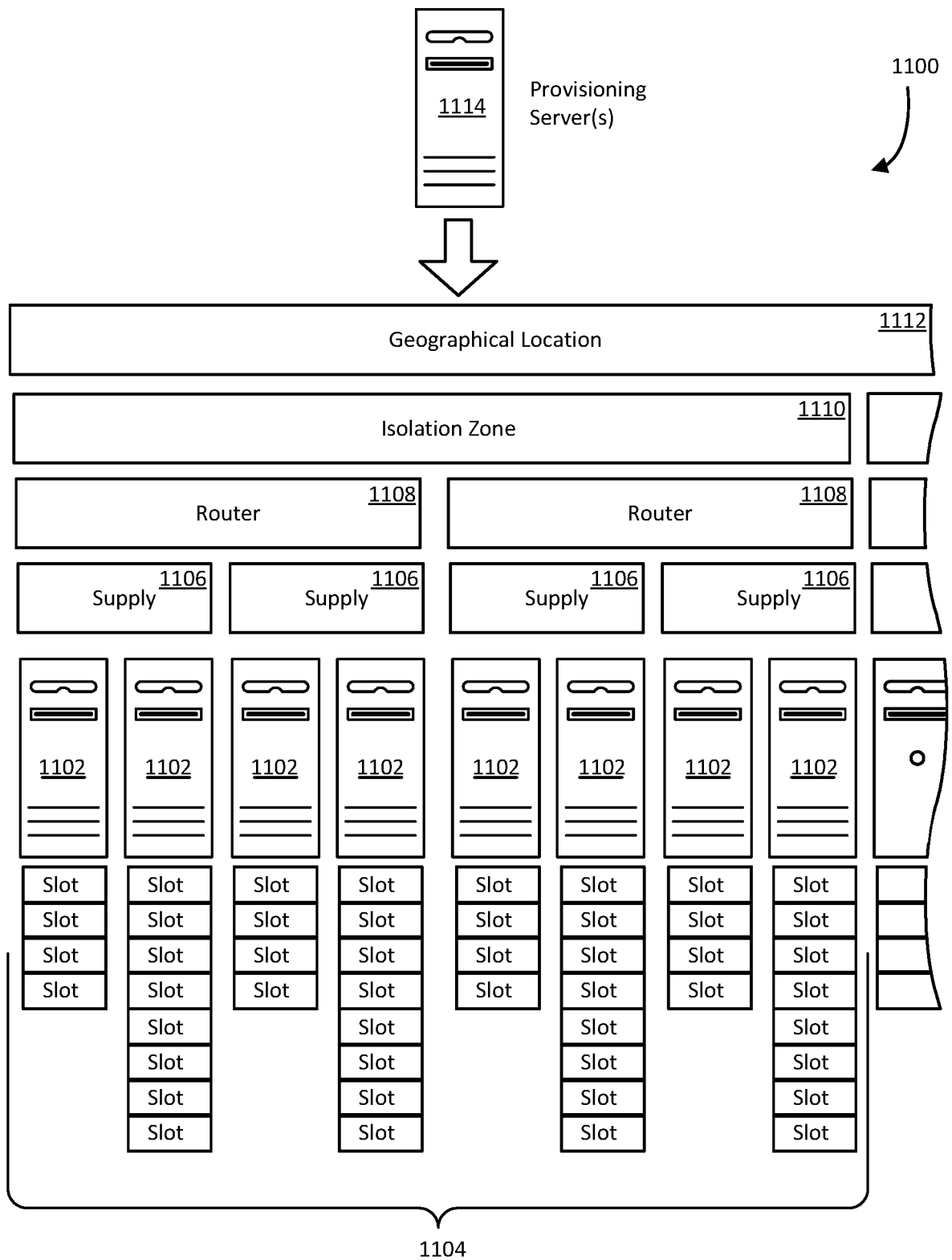
FIG. 11 is a diagram illustrating an system for providing a tagging framework in accordance with the present disclosure.

In some embodiments, such as in FIG. 11, a data center 1100 may be viewed as a collection of shared computing resources and/or shared infrastructure. For example, as shown in FIG. 11, a data center 1100 may include virtual machine slots 1104, physical hosts 1102, power supplies 1106, routers 1108, isolation zones 1110, and geographical locations 1112. A virtual machine slot 1104 may be referred to as a slot or as a resource slot. A physical host 1102 may be shared by multiple virtual machine slots 1104, each slot 1104 being capable of hosting a virtual machine, such as a guest domain. Multiple physical hosts 1102 may share a power supply 1106, such as a power supply 1106 provided on a server rack. A router 1108 may service multiple physical hosts 1102 across several power supplies 1106 to route network traffic. An isolation zone 1110 may service many routers 1108, the isolation zone 1110 being a group of computing resources that may be serviced by redundant resources such as a backup generator. Multiple isolation zones 1110 may reside at a geographical location 1112, such as a data center 1100. A provisioning server 1114 may include a memory and processor configured with instructions to analyze user data and rank available implementation resources using determined roles and shared resources/infrastructure in the calculation. The provisioning server 1114 may also manage workflows for provisioning and deprovisioning computing resources as well as detecting health and/or failure of computing resources.

A provisioning server 1114 may determine a placement of the resource within the data center. In some embodiments, this placement may be based at least in part on available computing resources and/or relationships between computing resources. In one embodiment, the distance between resources may be measured by the degree of shared resources. This distance may be used in the ranking of resources according to role. For example, a first system on a host 1102 that shares a router 1108 with a second system may be more proximate to the second system than to a third system only sharing an isolation zone 1110. Depending on an application, it may be desirable to keep the distance low to increase throughput or high to increase durability. In another embodiment, the distance may be defined in terms of unshared resources. For example, two slots 1104 sharing a router 1108 may have a distance of a physical host 1102 and may have a power supply 1106. Each difference in resources may be weighted differently in a distance calculation.

A placement calculation may also be used when selecting a prepared resource to transfer to a client account. In one embodiment, a client requests a virtual machine having an operating system. The provisioning server 1114 may determine that the request may be satisfied with a staged volume in a slot 1104. A placement decision may be made that determines which infrastructure may be desirable to share and which infrastructure is undesirable to share. Using the placement decision, a staged volume that satisfies at least some of the placement decision characteristics may be selected from a pool of available resources. For example, a pool of staged volumes may be used in a cluster computing setup. When a new volume is requested, a provisioning server 1114 may determine that a placement near other existing volumes is desirable for latency concerns. Therefore, the decision may find that sharing a router 1108 is desirable but sharing a supply 1106 and physical host 1102 is undesirable. A volume in the pool may then be selected that matches these attributes and placed preferably on a same router 1108 as the other volumes but not the same physical host 1102 or power supply 1106. In other examples of placement decisions, such as those relating to a database shard, sharing of infrastructure may be less desirable, and a volume may be selected that has less infrastructure in common with other related volumes.

Figure 12:
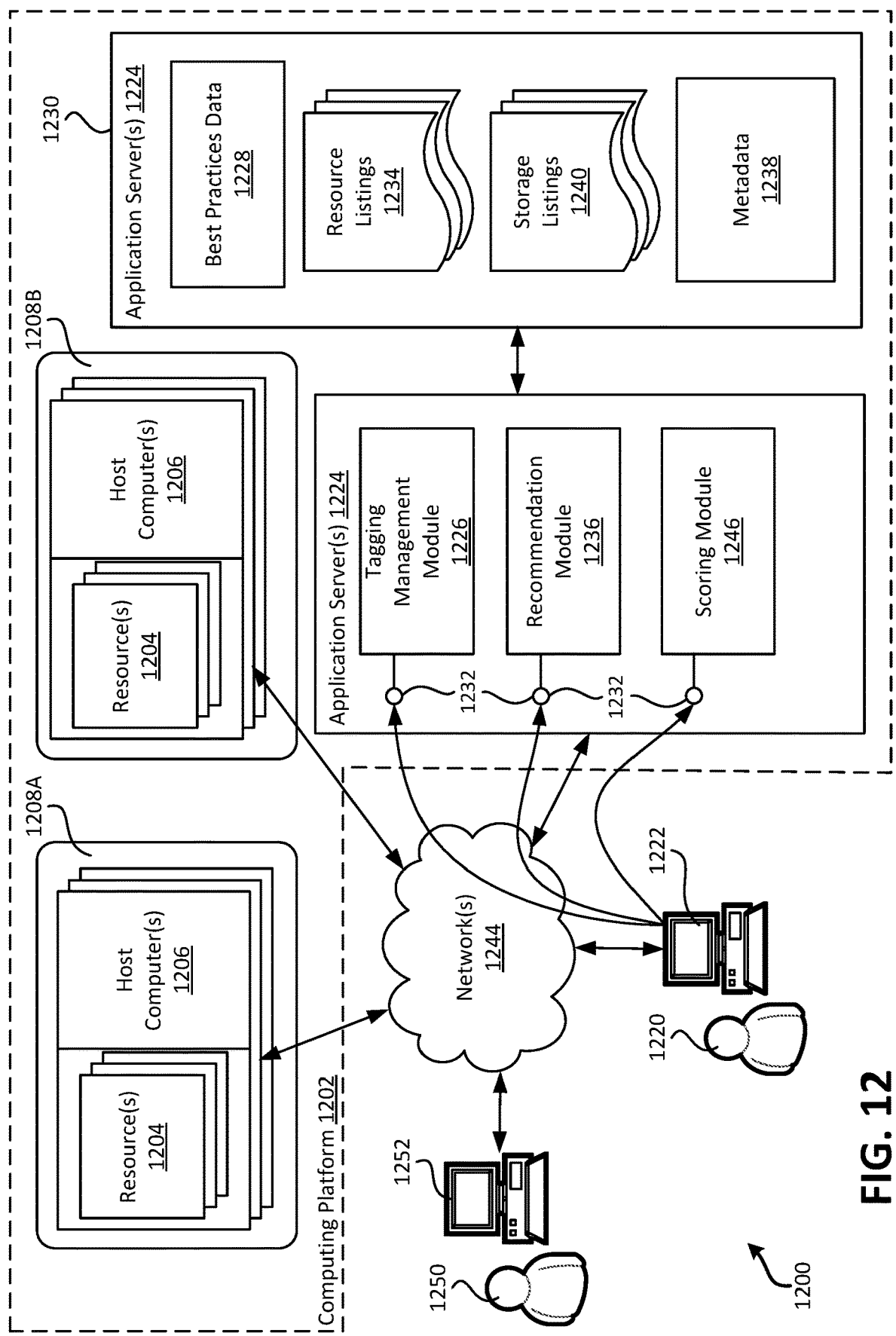
FIG. 12 is a diagram illustrating a system for providing a tagging framework in accordance with the present disclosure.

FIG. 12 is a system diagram that shows an illustrative operating environment 1200 including several components for implementing the tagging framework 180 of FIG. 1. The environment 1200 may include a computing platform 1202. The computing platform 1202 may be implemented by a computing resource provider to make computing resources available to customers 1220 for the deployment and execution of distributed applications.

The computing resources provided by the computing platform 1202 may include various classes of resources, such as data processing resources, data storage resources, data communication resources, and the like. Each class of computing resource may be general purpose or may be available in a number of specific configurations. For example, data processing resources provided by the computing resource provider may be made available in discrete units or resources 1204. Each instance 1204 may represent the data processing resources of a dedicated host computer 1206, referred to herein as a dedicated tenancy instance, or each instance 1204 may represent a virtual machine instance executing on a host computer 1206, which may also be referred to as a shared tenancy instance.

The host computers 1206 may represent generic multi-processor server devices, special purpose hardware devices, and the like. As discussed above, various types and configurations of instances 1204 may be made available. For example, each available instance 1204 of data processing resources may be of a particular size—such as small, medium, and large—representing different combinations of physical and/or virtual resources comprising or allocated to the instance, such as number and types of processors, amounts of memory, size and speed of local storage, number of networking addresses or communication channels, and/or the like. An instance 1204 may further be configured with a particular platform, such as a specific OS and/or hypervisor installed on the instance. Instances 1204 may also be made available with specific application software components installed, such as Web server software, database management software, portal software, a specific runtime environment or platform, and the like.

Instances may further be available in specific availability zones 1208A and 1208B, as described above. As discussed above, an availability zone 1208 may represent a particular physical location, such as a data center or other physical and/or logical grouping of underlying host computers 1206 and computing devices supporting the instances 1204 provided by the computing platform 1202. Providing instances 1204 in different sizes and in different availability zones 1208 may allow a deployed application to be geographically dispersed, improving end-user performance and insulating the overall application from failures in one particular location or zone. For example, a customer 1220 may choose to deploy a number of small instances 1204 across multiple availability zones 1208 for some functions of the application, such as Web servers, while deploying a single large instance 1204 for other functions, such as a database server, for example. The customer 1220 may also require that instances 1204 be hosted by host computers 1206 in particular geographical locations for geopolitical reasons as well.

End-users 1250 may utilize end-user computer systems 1252 to access the functionality of the application executing on the allocated instances 1204 through one or more networks 1244. The network(s) 1244 may represent a combination of local-area networks (LANs), wide-area networks (WANs), the Internet, and/or any other networking infrastructure known in the art that connects the host computers 1206 in the computing platform 1202 to the end-user computer systems 1252, to each other, and to other computing resources. The end-user computer systems 1252 may represent personal computers (PCs), desktop workstations, laptops, notebooks, personal digital assistants (PDAs), electronic-book readers, game consoles, set-top boxes, consumer electronics devices, server computers, or any other computing device capable of connecting to the network(s) 1244 and communicating with the host computers 1206 in the computing platform 1202.

A customer 1220 wishing to access resources on the computing platform 1202 may similarly utilize a customer computer system 1222 to connect the computing platform over the network(s) 1244 and to configure and manage the computing resources provided by the computing platform. In this regard, the computing platform 1202 may include a number of application servers 1224 that provide various management services to the customer 1220 for purchasing and maintaining instances 1204 of data processing and/or other computing resources, deploying components of the application across the purchased instances 1204, monitoring and administering execution of the application, and the like. As in the case of the end-user computer systems 1252, the customer computer systems 1222 may represent PCs, desktop workstations, laptops, notebooks, PDAs, electronic-book readers, game consoles, set-top boxes, consumer electronics devices, server computers, or any other computing device capable of connecting to the network(s) 1244 and communicating with the application servers 1224 in the computing platform 1202.

The application servers 1224 may represent standard server computers, database servers, Web servers, network appliances, desktop computers, other computing devices, and any combination thereof. The application servers 1224 may execute a number of modules in order to provide the management services. The modules may execute on a single application server 1224 or in parallel across multiple application servers in the computing platform 1202. In addition, each module may consist of a number of subcomponents executing on different application servers 1224 or other computing devices in the computing platform 1202. The modules may be implemented as software, hardware, or any combination of the two.

The application servers 1224 may execute a tagging management module 1226. Instances 1204 may include instances that may be obtained through various modes, such as reserved instances, spot instances, and on demand instances as described above. Purchased instances 1204 for each customer 1220 and corresponding configuration and status information may be stored in best practices data 1228. The best practices data 1228 may be stored in a database 1230 or other data storage system available to the application server(s) 1224 in the computing platform 1202.

As described above, reserved instances provide the customer with the ability to reserve a number of a specific type and configuration of instances for a term, such as one year or three years. The reserved instances may represent actual instances of data processing resources configured as specified and placed in stand-by for launch and deployment by the customer 1220 at a future time, or the reserved instances 1204 may represent overall capacity reserved by the computing resource provider for quick configuration and launch when required. When deploying an application, a customer 1220 may purchase and launch a number of on-demand instances 1204 of a specific type and configuration (e.g., size, platform, tenancy, availability zone, and the like) to support immediate availability of the application, as well as a number of reserved instances of the same or similar type and configuration for scaling up the application in the future in response to increased demand or capacity requirements of the application, for example.

A customer 1220 may utilize a Web browser application executing on the customer computer system 1222 to access a user interface presented by the tagging management module 1226 through a Web service to perform the configuration and maintenance of customer 1220's purchased instances 1204. The customer 1220 may also utilize a Web browser application executing on the customer computer system 1222 to access a user interface presented by the recommendation module 1236 through a Web service to request status security recommendations as discussed above. Additionally or alternatively, the tagging management module 1226 and recommendation module 1236 may expose an application programming interface (API) 1232, which may be accessed over the network(s) 1244 by stand-alone application programs executing on the customer computer system 1222. Other mechanisms for accessing the configuration and maintenance services of the tagging management module 1226 or scoring module 1246 may also be imagined, including remote procedure calls, SOAP-based Web services, remote file access, proprietary client-server architectures, and the like.

In some embodiments, the tagging management module 1226 may allow users to access, edit, or add tags. The customer 1220 may also submit a request that so that recommendation module 1236 can determine security recommendations. The recommendation module 1236 and scoring module 1246 may access the reserved instance listings 1234, storage listings 1240, and metadata 1238 in the database 1230 to access metrics data and process the metadata to generate recommendations.

The application servers 1224 may execute recommendation module 1236 and scoring module 1246. The customer 1220 may utilize a Web browser application executing on the customer computer system 1222 to access a user interfaces (UI) presented by the scoring module 1246 through a Web service. Additionally or alternatively, the scoring module 1246 may expose an API 1232, which may be accessed over the network(s) 1244 by stand-alone application programs executing on the customer computer system 1222.

In some embodiments, an API or a programming interface sub-system may be provided for facilitating the submission of requests for instance status analysis. The API may be configured to receive electronic messages that encode identifiers indicative of a selection of instances in the context of status related to a metric of interest. In response to receiving one of the electronic messages, the API may send second electronic messages indicative of information pertaining to parameters that are likely causes for differences between the selected instances and non-selected instances.

In additional embodiments, the tagging module 1226 or other modules in the computing platform 1202 may provide user interfaces or APIs 1232 to the customer 1220 and/or customer computer system 1222 that allow the customer 1220 to review results for a current request or previous request.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems, and data structures may also be stored (e.g., as software instructions or structured data) on a computer-readable medium, such as a hard disk, a memory, a network or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for generating a security recommendation for computing resources in a provider network, the method comprising:

identifying parameters to collect as metadata associated with transactions associated with an entity that accesses the computing resources in the provider network, the identification based on a relationship to a security property;

tagging the metadata with information related to the security property to create tagged metadata;

determining whether the tagged metadata fits a pattern requiring a recommendation to change a security parameter of at least one computing resource among the computing resources by making a change to the at least one computing resource; and providing the recommendation to a user associated with the entity.

2. The method according to claim 1, wherein determining comprises selecting a period of time for a selected subset of computing resources and comparing a security rating for the selected subset of resources to a different time period having a different security rating.

3. The method according to claim 1, wherein the metadata comprises compliance metadata.

4. The method according to claim 1, wherein the tagged metadata includes predetermined schema indicative of compliance with one or more security and assurance frameworks.

5. The method according to claim 1 comprising verifying that a process is authorized to access tagged metadata associated with the computing resources of the provider network, wherein the tagged metadata is access restricted to authorized processes and wherein the tagged metadata is cryptographically bound.

6. The method according to claim 1 comprising applying a revision control mechanism to tagged metadata that is added or modified by a requesting process by maintaining revision control information regarding access to the tagged metadata by authorized processes.

7. The method as recited in claim 1 comprising restricting visibility of the tagged metadata by processes that are not authorized to access the tagged metadata.

8. A system for generating a security recommendation for computing resources in a provider network, the system comprising:
    at least one processor;
    at least one memory having stored thereon instructions that, upon execution by the at least one processor, are operable at least to:
    identify parameters to collect as metadata associated with transactions associated with an entity that accesses the computing resources in the provider network, the identification based on a relationship to a security property;
    tag metadata with information related to the security property to create tagged metadata;
    determine whether the tagged metadata fits a pattern requiring a recommendation to change a security attribute of at least one computing resource among the computing resources by making a change to the at least one computing resource; and
    provide the recommendation to a user associated with the entity.

9. The system as recited in claim 8, wherein the at least one memory having stored thereon instructions that, upon execution by the at least one processor, are operable at least to determine whether the tagged metadata fits a patter by comparing a security rating for a selected period of time for a selected subset of computing resources to the selected subset of resources for a different time period having a different security rating.

10. The system as recited in claim 8, wherein the metadata comprises compliance metadata.

11. The system as recited in claim 8, wherein the tagged metadata includes predetermined schema indicative of compliance with one or more security and assurance frameworks.

12. The system as recited in claim 8, wherein the at least one memory having stored thereon instructions that, upon execution by the at least one processor, are operable at least to verifying that a process is authorized to access tagged metadata associated with the computing resources of the provider network, wherein the tagged metadata is access restricted to authorized processes and wherein the tagged metadata is cryptographically bound.

13. The system as recited in claim 8, wherein the at least one memory having stored thereon instructions that, upon execution by the at least one processor, are operable at least to apply a revision control mechanism to tagged metadata that is added or modified by a requesting process by maintaining revision control information regarding access to the tagged metadata by authorized processes.

14. The system as recited in claim 8, wherein the at least one memory having stored thereon instructions that, upon execution by the at least one processor, are operable at least to restrict visibility of the tagged metadata by processes that are not authorized to access the tagged metadata.

15. A non-transitory computer-readable medium bearing computer readable instructions that upon execution by a processor, cause a system at least to:
    identify parameters to collect as metadata associated with transactions associated with an entity that accesses the computing resources in the provider network, the identification based on a relationship to a security property;
    tag metadata with information related to the security property to create tagged metadata;
    determine whether the tagged metadata fits a pattern requiring a recommendation to change a parameter affecting the security of at least one computing resource among the computing resources by making a change to the at least one computing resource; and
    provide the recommendation to a user associated with the entity.

16. The non-transitory computer-readable medium as recited in claim 15, wherein computer readable instructions upon execution by the processor further cause the system at least to determine whether the tagged metadata fits a patter by comparing a security rating for a selected period of time for a selected subset of computing resources to the selected subset of resources for a different time period having a different security rating.

17. The non-transitory computer-readable medium as recited in claim 15, wherein the tagged metadata includes predetermined schema indicative of compliance with one or more security and assurance frameworks.

18. The non-transitory computer-readable medium as recited in claim 15, wherein computer readable instructions upon execution by the processor further cause the system at least to verifying that a process is authorized to access tagged metadata associated with the computing resources of the provider network, wherein the tagged metadata is access restricted to authorized processes and wherein the tagged metadata is cryptographically bound.

19. The non-transitory computer-readable medium as recited in claim 15, wherein the computer readable instructions upon execution by the processor further cause the system at least to apply a revision control mechanism to tagged metadata that is added or modified by a requesting process by maintaining revision control information regarding access to the tagged metadata by authorized processes.

20. The non-transitory computer-readable medium as recited in claim 15, wherein the computer readable instructions upon execution by the processor further cause the system at least to restrict visibility of the tagged metadata by processes that are not authorized to access the tagged metadata.

* * * * *